(12) United States Patent
Watazawa

(10) Patent No.: US 11,595,572 B2
(45) Date of Patent: Feb. 28, 2023

(54) IMAGE PROCESSING APPARATUS, IMAGE CAPTURING APPARATUS, CONTROL METHOD, AND STORAGE MEDIUM

(71) Applicant: CANON KABUSHIKI KAISHA, Tokyo (JP)

(72) Inventor: Naoko Watazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 130 days.

(21) Appl. No.: 17/060,176

(22) Filed: Oct. 1, 2020

(65) Prior Publication Data

US 2021/0112198 A1    Apr. 15, 2021

(30) Foreign Application Priority Data

Oct. 15, 2019    (JP) ............................. JP2019-188864

(51) Int. Cl.
     *H04N 5/232*      (2006.01)
     *G06T 7/50*      (2017.01)
     *G06V 10/25*      (2022.01)

(52) U.S. Cl.
     CPC ........... *H04N 5/23229* (2013.01); *G06T 7/50* (2017.01); *G06V 10/25* (2022.01)

(58) Field of Classification Search
     CPC ....... H04N 5/23229; H04N 2013/0081; H04N 5/2621; H04N 5/2354; H04N 5/2351; H04N 5/265; G06T 7/50; G06T 2207/30196; G06T 5/50; G06T 2207/10004; G06T 2207/10028; G06T 5/008; G06T 7/11;

(Continued)

(56) References Cited

U.S. PATENT DOCUMENTS 10,475,237 B2    11/2019    Hata
10,863,103 B2    12/2020    Watazawa
(Continued)

FOREIGN PATENT DOCUMENTS

| CN | 110324529 A | 10/2019 |
|---|---|---|
| JP | 2016-072694 A | 5/2016 |
| WO | 2016/047072 A | 3/2016 |

OTHER PUBLICATIONS

Extended European Search Report dated Mar. 2, 2021, issued in corresponding European Patent Application No. 20199525.5.

(Continued)

*Primary Examiner* — Lin Ye
*Assistant Examiner* — Tuan H Le
(74) *Attorney, Agent, or Firm* — Venable LLP

(57) ABSTRACT

An image processing apparatus includes obtaining distance information and subject information with respect to a captured image, specifying, based on the obtained distance information, a first subject region in which images of subjects that exist in a predetermined distance range are distributed in the captured image, specifying, based on the subject information and independently of the obtained distance information, specifying a second subject region that includes a region from which the predetermined subject has been detected in the captured image, and determining a target region for which the image processing is executed with reference to at least one of the first subject region and the second subject region. A subject region varies depending on at least one of an image capture condition of the captured image and a state of the captured image.

22 Claims, 9 Drawing Sheets

(58) Field of Classification Search
CPC ......... G06T 7/194; G06T 15/50; G06T 7/586;
G06T 2207/20012; G06T 2207/30201;
G06T 5/003; G06T 5/009; G06T 7/90;
G06T 2207/20192; G06V 10/25
See application file for complete search history.

(56) References Cited

U.S. PATENT DOCUMENTS

| | | | |
|---|---|---|---|
| 2007/0177050 A1* | 8/2007 | Xiao | H04N 5/23219 348/371 |
| 2016/0127630 A1* | 5/2016 | Kitajima | H04N 5/2351 348/370 |
| 2017/0084068 A1* | 3/2017 | Son | G06T 15/50 |
| 2018/0249090 A1* | 8/2018 | Nakagawa | G09G 5/00 |
| 2019/0260921 A1 | 8/2019 | Watazawa | |
| 2019/0304071 A1 | 10/2019 | Kitajima | |
| 2019/0340810 A1* | 11/2019 | Sunkavalli | G06T 15/506 |

OTHER PUBLICATIONS

Chinese Office Action issued on Oct. 10, 2022, in Chinese Patent Application No. 2020/11090861 (15 pages).

* cited by examiner

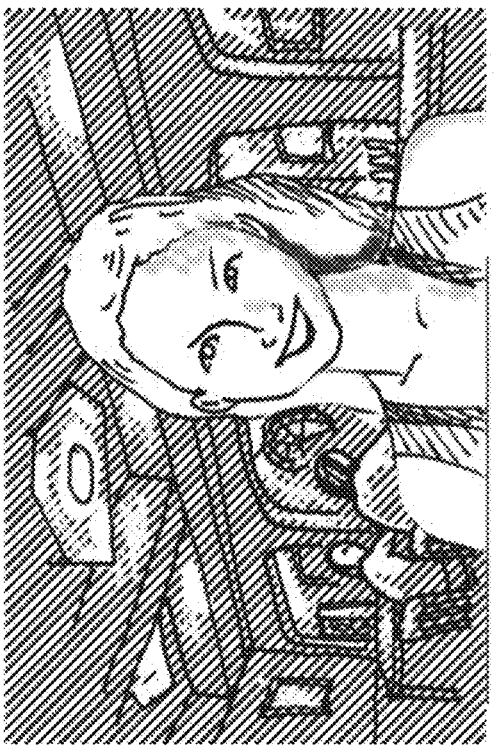
FIG. 7A
BEFORE RELIGHTING PROCESSING
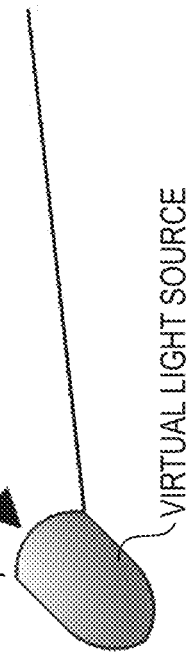
VIRTUAL LIGHT SOURCE
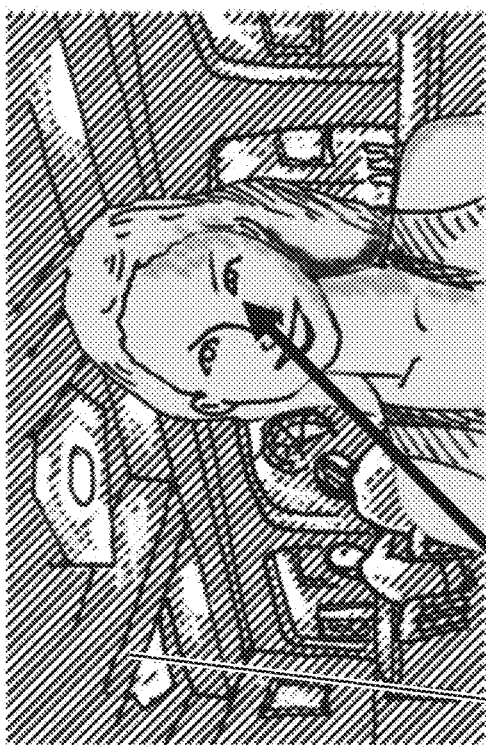
FIG. 7B
AFTER RELIGHTING PROCESSING

IMAGE PROCESSING APPARATUS, IMAGE CAPTURING APPARATUS, CONTROL METHOD, AND STORAGE MEDIUM

CROSS-REFERENCE TO RELATED APPLICATION

This application claims the benefit of Japanese Patent Application No. 2019-188864, filed Oct. 15, 2019, which is hereby incorporated by reference herein in its entirety.

BACKGROUND

Field of the Invention

The present invention relates to a technique that applies, to an image obtained through shooting, image processing for adding predetermined effects after image capture.

Description of the Related Art

There are known techniques in which, with respect to a captured image obtained through image capture, a subject region is detected, and such image processing as correction processing is applied to the subject region. For example, there is so-called relighting processing that adds the effects of irradiation with a virtual light source to a detected subject region (Japanese Patent Laid-Open No. 2016-072694). With the relighting processing, a dark region that appears in a captured image due to environmental light at the time of shooting, such as shadows, can be brightened, and a captured image with a favorable atmosphere can be obtained.

For example, Japanese Patent Laid-Open No. 2016-072694 discloses relighting processing that can appropriately correct the states of shadows on a subject. Specifically, the states of shadows in a predetermined region of a subject in a shot image are detected, and the characteristics of a virtual light source are determined based on the detected states of shadows. Then, the shot image is corrected so as to achieve the states of shadows corresponding to a case when light irradiation has been performed using a virtual light source that have the determined characteristics.

Meanwhile, Japanese Patent Laid-Open No. 2016-072694 does not particularly mention a method of detecting a subject region. A subject region that includes a main subject of Japanese Patent Laid-Open No. 2016-072694 in a captured image can be specified, as a region composed of pixels indicating a predetermined distance range including the main subject, by obtaining, for example, information of a distribution of distances in the depth direction to subjects that exist in an image capture range (distance information).

Therefore, specifying subject regions by obtaining the distance information makes it possible, for example, to distinguish between a subject region indicating a subject at the front (foreground) and a subject region indicating a subject in the back (distant view). As a result, the relighting processing of Japanese Patent Laid-Open No. 2016-072694 can generate images that show changes based on the differences among the distances from a virtual light source to subjects and the amounts (intensities) of irradiation, both in a case when a subject in the foreground is irradiated and in a case when a subject in the background is irradiated using one virtual light source.

On the other hand, with a method that specifies a subject region based on distance information, it may be difficult to favorably specify a subject region depending on the accuracy of measurement of distance information. For example, under image capture conditions (the states of image capture settings and image capture environments) that are disadvantageous in obtaining distance information, images of subjects do not finely appear in a captured image, and thus the accuracy of derived subject distances becomes low.

SUMMARY

The present invention has been made in view of the aforementioned problem, and aims to provide an image processing apparatus that favorably specifies a subject region and realizes, for example, the addition of desired effects to the subject region, an image capturing apparatus, a control method, and a program.

The present invention in its first aspect provides an image processing apparatus that executes, with respect to a captured image, image processing for a region that includes a predetermined subject, the image processing apparatus comprising an obtaining unit configured to obtain distance information and subject information with respect to the captured image, the distance information indicating a distribution of subject distances in a depth direction, the subject information indicating a result of detection of the predetermined subject included in the captured image, a first specifying unit configured, based on the distance information obtained by the obtaining unit, to specify a first subject region in which images of subjects that exist in a predetermined distance range are distributed in the captured image, a second specifying unit configured to, based on the subject information and independently of the distance information obtained by the obtaining unit, to specify a second subject region that includes a region from which the predetermined subject has been detected in the captured image, and a determining unit configured to determine a target region for which the image processing is executed with reference to at least one of the first subject region and the second subject region, wherein the determining unit makes a subject region that is referred to vary depending on at least one of an image capture condition of the captured image and a state of the captured image.

The present invention in its second aspect provides an image capturing apparatus, comprising an image capturing unit configured to capture the captured image; and the image processing apparatus of the first aspect.

The present invention in its third aspect provides a control method for an image processing apparatus that executes, with respect to a captured image, image processing for a region that includes a predetermined subject, the control method comprising obtaining distance information and subject information with respect to the captured image, the distance information indicating a distribution of subject distances in a depth direction, the subject information indicating a result of detection of the predetermined subject included in the captured image, based on the distance information obtained in the obtaining, specifying a first subject region in which images of subjects that exist in a predetermined distance range are distributed in the captured image, based on the subject information and independently of the distance information obtained in the obtaining, specifying a second subject region that includes a region from which the predetermined subject has been detected in the captured image, and determining a target region for which the image processing is executed with reference to at least one of the first subject region and the second subject region, wherein, in the determining, a subject region that is referred to varies depending on at least one of an image capture condition of the captured image and a state of the captured image.

The present invention in its fourth aspect provides a computer-readable storage medium storing a program for causing a computer to function as each unit of the image processing apparatus of the first aspect.

Further features of the present invention will become apparent from the following description of exemplary embodiments (with reference to the attached drawings).

BRIEF DESCRIPTION OF THE DRAWINGS

FIGS. 7A and 7B are diagrams for describing a state where the relighting processing has been applied according to the embodiment of the present invention.

DESCRIPTION OF THE EMBODIMENTS

Figure 1:
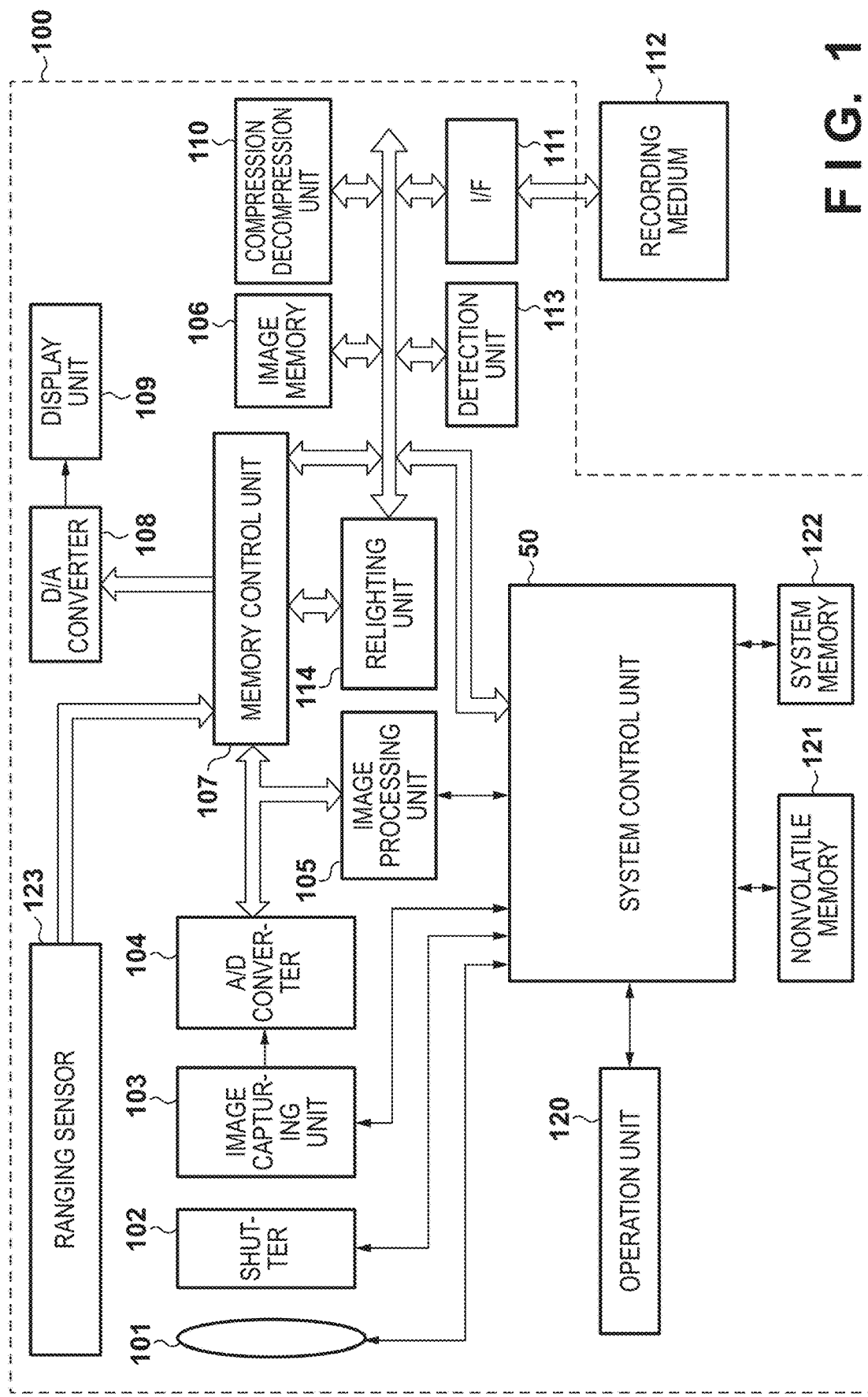
FIG. 1 is a block diagram exemplarily showing a functional configuration of a digital camera 100 according to an embodiment of the present invention.

Hereafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and a redundant description thereof is omitted.

An embodiment described below provides a description of an example in which the present invention is applied to a digital camera that serves as an example of an image processing apparatus and that can obtain a captured image and distance information that indicates a distribution of subject distances in the depth direction of subjects that exist in an image capture range related to the captured image. However, the present invention is applicable to any device that can obtain a captured image and distance information that indicates a distribution of subject distances of subjects that exist in an image capture range related to the captured image.

<<Configuration of Digital Camera 100>>

FIG. 1 is a block diagram showing a functional configuration of a digital camera 100 according to an embodiment of the present invention.

An image capturing unit 103 is, for example, an image sensor, such as a CCD or CMOS sensor, and photoelectrically converts an optical image that has been formed on an image capturing plane via a lens assembly 101 (image capturing optical system), which includes a zoom lens and a focus lens, and a shutter 102 that has a diaphragm function. The image capturing unit 103 outputs analog image signals obtained through the photoelectric conversion to an A/D converter 104. It is assumed that the image sensor included in the image capturing unit 103 uses color filters of the Bayer arrangement, and a signal of each pixel output from the image capturing unit 103 indicates the signal intensity of one of R, G, and B. The A/D converter 104 converts the input analog image signals into digital image signals (image data), and outputs the digital image signals to an image processing unit 105.

The image processing unit 105 performs various types of image processing, such as color conversion processing (e.g., white balance), γ processing, edge enhancement processing, and color correction processing, with respect to image data input from the A/D converter 104 or image data that has been read out from an image memory 106 via a memory control unit 107. Image data (captured image) that has been output after the image processing has been applied thereto by the image processing unit 105 is stored into the image memory 106 via the memory control unit 107. The image memory 106 is a recording apparatus that stores image data output from the image processing unit 105 and image data to be displayed on a display unit 109. It is assumed that the image processing unit 105 of the present embodiment has a functional configuration shown in FIG. 2. The details of its operations at the time of image capture will be described later with reference to a flowchart of FIG. 3.

A detection unit 113 detects a region that is included in a captured image and in which an image of a pre-designated subject appears. Although the present embodiment is described under the assumption that the detection unit 113 detects the images of a human face and organs that compose a face as the pre-designated subject, the present invention is not limited to being embodied in this way. Subjects to be detected are not limited to humans, and may include other animals and moving objects, as well as pre-registered buildings and objects. Furthermore, although the present embodiment is described under the assumption that the digital camera 100 includes one detection unit 113, a configuration for detecting subjects is not limited to this, and a plurality of detection units 113 that respectively detect different types of subjects may be included. Therefore, it goes without saying that the detection unit 113 may be configured to be capable of detecting an image of a subject that has been designated as a detection target, and subject information, which will be described later, is information with contents based on the setting of a detection target in each case. A subject mentioned in the following description refers to the aforementioned pre-designated subject. Also, a region other than a subject may be referred to as a background.

The image processing unit 105 also performs processing for deriving evaluation values of an in-focus state using the result of detection performed by the detection unit 113 and a captured image, and outputs the obtained evaluation values to a system control unit 50. At this time, based on the obtained evaluation values, the system control unit 50 performs exposure control, such as AF (autofocus) processing, AE (automatic exposure) processing, and AWB (auto white balance) processing according to a TTL (through-the-lens) method, and ranging control.

A D/A converter 108 converts digital image data for display stored in the image memory 106 into analog signals, and supplies the analog signals to the display unit 109. The display unit 109 performs display control so that, for example, the analog signals from the D/A converter 108 are displayed on a display apparatus, such as an LCD.

A compression/decompression unit 110 performs compression encoding processing based on such standards as JPEG and MPEG with respect to a captured image and image data stored in the image memory 106. The system control unit 50 stores encoded image data into a recording medium 112, such as a memory card and a hard disk, via an interface (I/F) 111. Furthermore, the compression/decompression unit 110 decodes and decompresses image data that has been read out from the recording medium 112 via the I/F 111, and stores the decoded and decompressed image data into the image memory 106. This stored image data is displayed by the display unit 109 via the memory control unit 107 and the D/A converter 108.

A relighting unit 114 performs relighting processing that corrects a subject in a scene shown by a captured image to an illuminated state (brightness) in which simulative irradiation is performed with a virtual light source after image capture. The relighting processing performed by the relighting unit 114 will be described later in detail with reference to other drawings.

The system control unit 50 is, for example, a computational apparatus, such as a microprocessor, and controls the operations of respective blocks included in the digital camera 100. A nonvolatile memory 121 is composed of a memory, such as an EEPROM, and stores programs, parameters, and the like, that are necessary for processing of the system control unit 50. The system control unit 50 executes processing related to control of the operations of respective blocks by deploying the programs, as well as constants and variables for the operations of the system control unit 50, recorded in the nonvolatile memory 121 to a system memory 122 and executing the deployed programs, constants, and variables. The system memory 122 may be, for example, a volatile storage apparatus, and may be used not only as an area to which various types of data are deployed, but also as a storage area that stores intermediate data output through the operations of respective blocks.

An operation unit 120 is, for example, user interfaces included in the digital camera 100, such as a release switch and a menu button; when an operational input has been performed with respect to the user interfaces, the operation unit 120 outputs a control signal corresponding to the operational input to the system control unit 50. The operation unit 120 accepts an operational input related to, for example, a menu setting and image selection.

A ranging sensor 123 performs ranging with respect to subjects that exit in an image capture range of the digital camera 100. In the present embodiment, it is assumed that the ranging sensor 123 derives subject distances using a stereoscopic method based on captured images that have been obtained by capturing the image capture range from two different viewpoints. Distance information may be configured, for example, based on captured images or on captured images that were captured, for example, immediately before image capture, and it is assumed that the distance information has a two-dimensional pixel structure similarly to captured images. With respect to two captured images that have been obtained for the purpose of deriving distances using the stereoscopic method, respective pixels of distance information may store, for example, information of the amounts of relative positional displacement between two sets of pixels when the correspondence between the images of respective pixels in one image and the positions in which these images appear in the other image has been identified.

Although the present embodiment is described in relation to a mode in which the ranging sensor 123 is provided separately from the image capturing unit 103, the image capturing unit 103 may operate as the ranging sensor 123. Specifically, a plurality of microlenses may be provided respectively for pixels of the image sensor, and a plurality of images that differ in parallax may be obtained respectively for the pixels.

<<Configuration of Image Processing Unit and Operations Thereof at Time of Image Capture>>

Next, the details of a configuration of the image processing unit 105 and the operations thereof at the time of image capture will be described with reference to a block diagram of FIG. 2 and a flowchart of FIG. 3.

Figure 2:
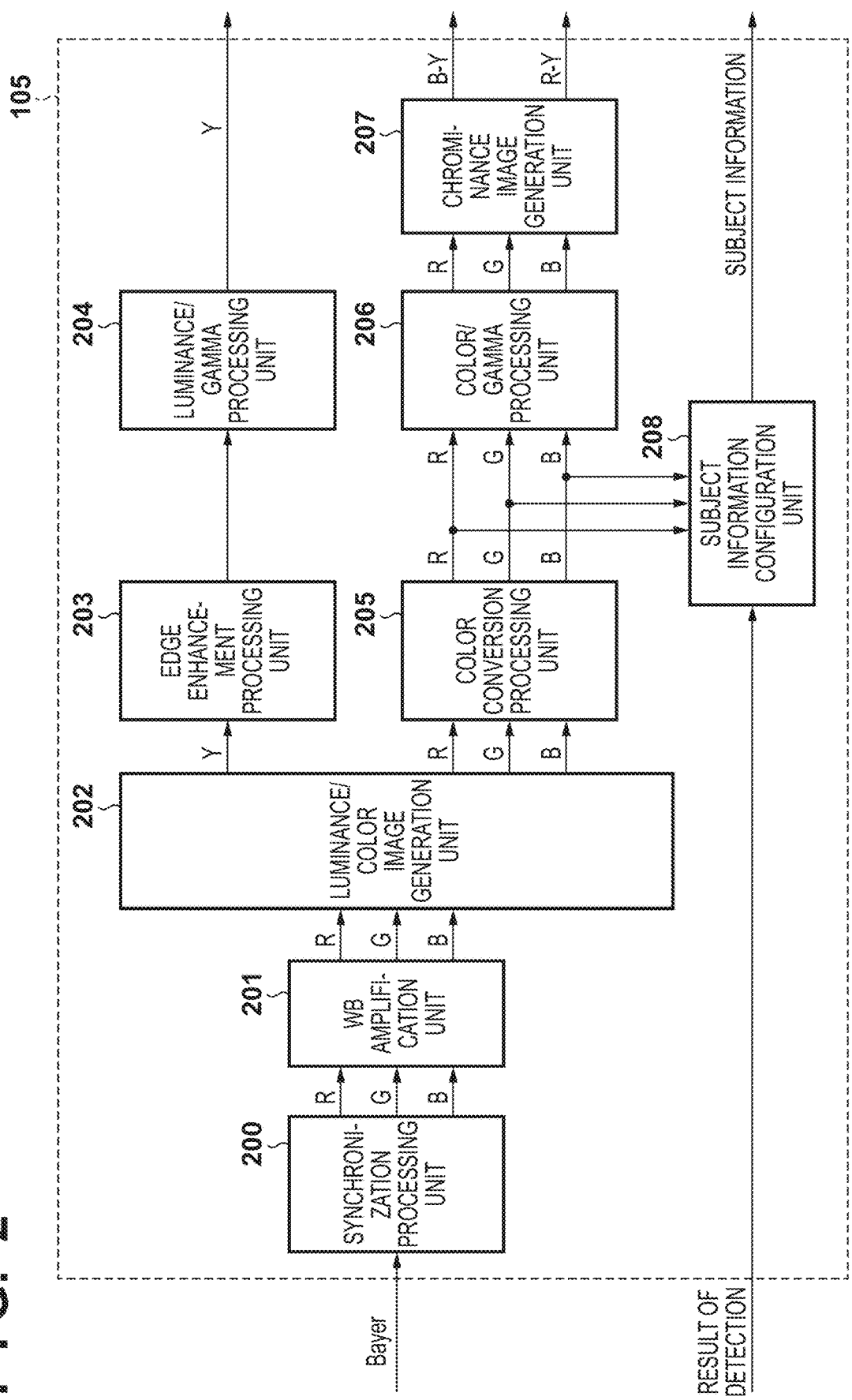
FIG. 2 is a block diagram exemplarily showing a detailed configuration of an image processing unit 105 according to the embodiment of the present invention.
Figure 3:
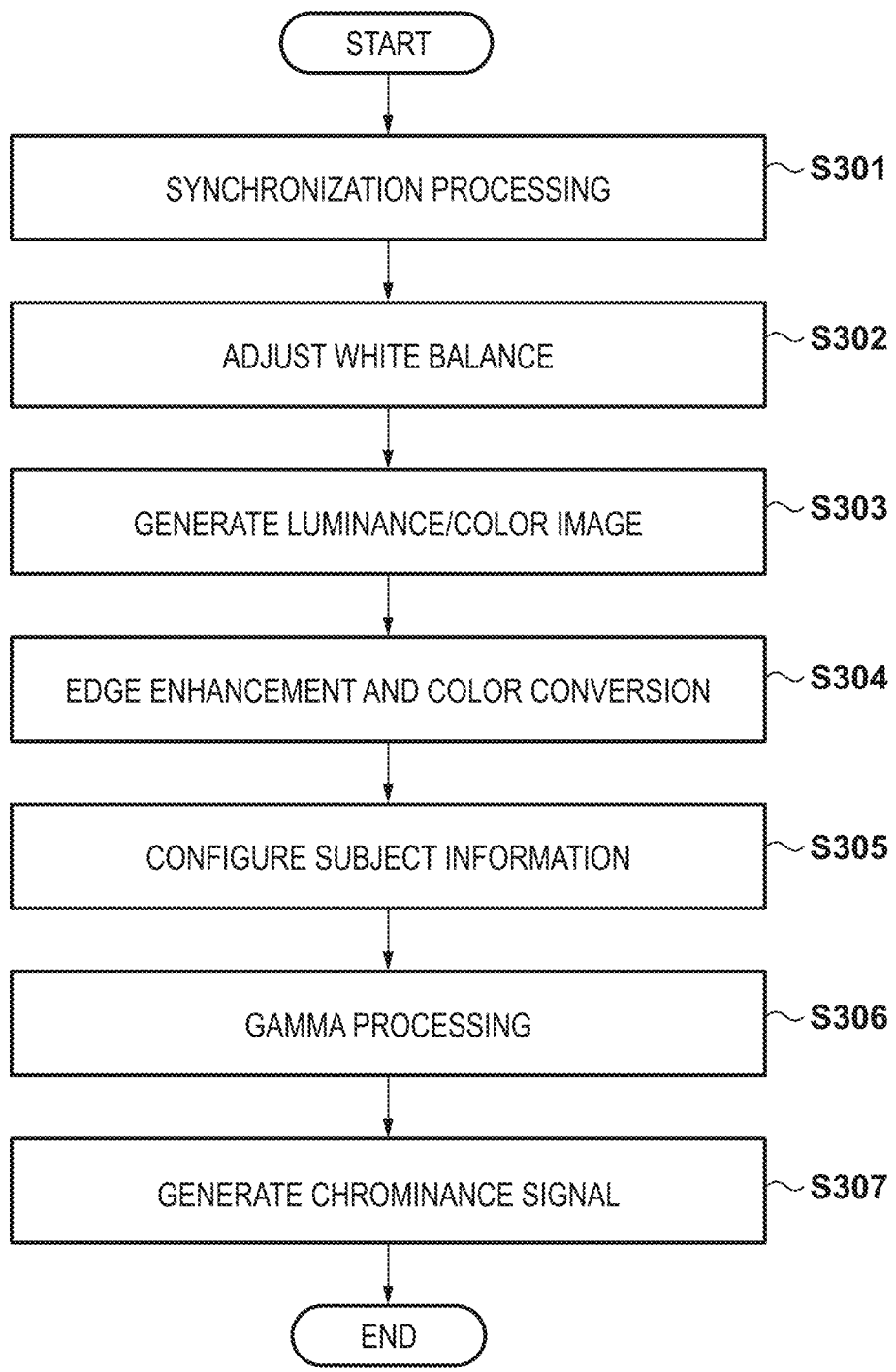
FIG. 3 is a flowchart exemplarily showing the operations of the image processing unit 105 according to the embodiment of the present invention.

As shown in FIG. 2, the image processing unit 105 of the present embodiment accepts, as inputs, image signals captured by the image capturing unit 103 and the result of detection performed by the detection unit 113. Then, the image processing unit 105 configures a captured image composed of luminance signals and chrominance signals, as well as information related to subjects included in the captured image (subject information), and outputs the captured image and the subject information. The subject information mentioned here may include, for example, the number of people included in the captured image as subjects, their positions, their facial sizes, contrast, and information indicating the states of shadows (shadow information).

When image data corresponding to Bayer RGB has been input from the A/D converter 104, a synchronization processing unit 200 performs synchronization processing with respect to the image data in step S301, and complements information of color components in which respective pixels are deficient, thereby generating an RGB image.

In step S302, a WB amplification unit 201 applies processing for adjusting white balance to the RGB image generated in step S301. White balance may be adjusted based on a white balance gain value that has been derived by the system control unit 50 in known processing. Once white balance of the RGB image has been adjusted, the WB amplification unit 201 outputs post-adjustment RGB signals to a luminance/color image generation unit 202.

In step S303, the luminance/color image generation unit 202 generates a luminance image Y based on the input RGB signals, and outputs the luminance image Y to an edge enhancement processing unit 203. The luminance/color image generation unit 202 also outputs the input RGB image to a color conversion processing unit 205. In the flowchart shown in FIG. 3, processing related to the luminance image Y and processing related to the RGB image are described in a sequenced way within one flow for the sake of convenience. It should be understood, however, that the present invention is not limited to being embodied in this way. That is to say, processing with respect to the luminance image Y and processing that is performed by the image processing unit 105 with respect to the RGB image may be executed in parallel.

In step S304, the edge enhancement processing unit 203 applies edge enhancement processing to the input luminance image Y, and outputs the post-processing luminance image Y to a luminance/gamma processing unit 204. Also, the color conversion processing unit 205 converts the input RGB image into an image with predetermined color balance by applying, for example, matrix computation to the RGB image, and outputs the image with predetermined color balance to a color/gamma processing unit 206 and a subject information configuration unit 208.

In step S305, the subject information configuration unit 208 configures subject information related to the captured image based on information of the result of detection of faces or facial organs performed by the detection unit 113 and on the RGB image input from the color conversion processing unit 205. The subject information configuration unit 208 specifies information of the number of people who serve as subjects, their positions, and their facial sizes based on the result of detection performed by the detection unit 113. The subject information configuration unit 208 also specifies contrast and shadow information related to the detected subjects based on, for example, average luminance information and luminance histogram information of the images of an entirety of the captured image and respective subjects. Once the subject information has been configured, the subject information configuration unit 208 stores the same into, for example, the system memory 122.

In step S306, the luminance/gamma processing unit 204 applies gamma correction to the input luminance image Y, and stores the post-processing luminance image Y into the image memory 106 via the memory control unit 107. Also, the color/gamma processing unit 206 similarly applies gamma correction to the input RGB image, and outputs the post-processing image to a chrominance image generation unit 207.

In step S307, the chrominance image generation unit 207 generates chrominance images R-Y, B-Y from the RGB image, and stores them into the image memory 106 via the memory control unit 107.

<<Configuration of Relighting Unit>>

Figure 4:
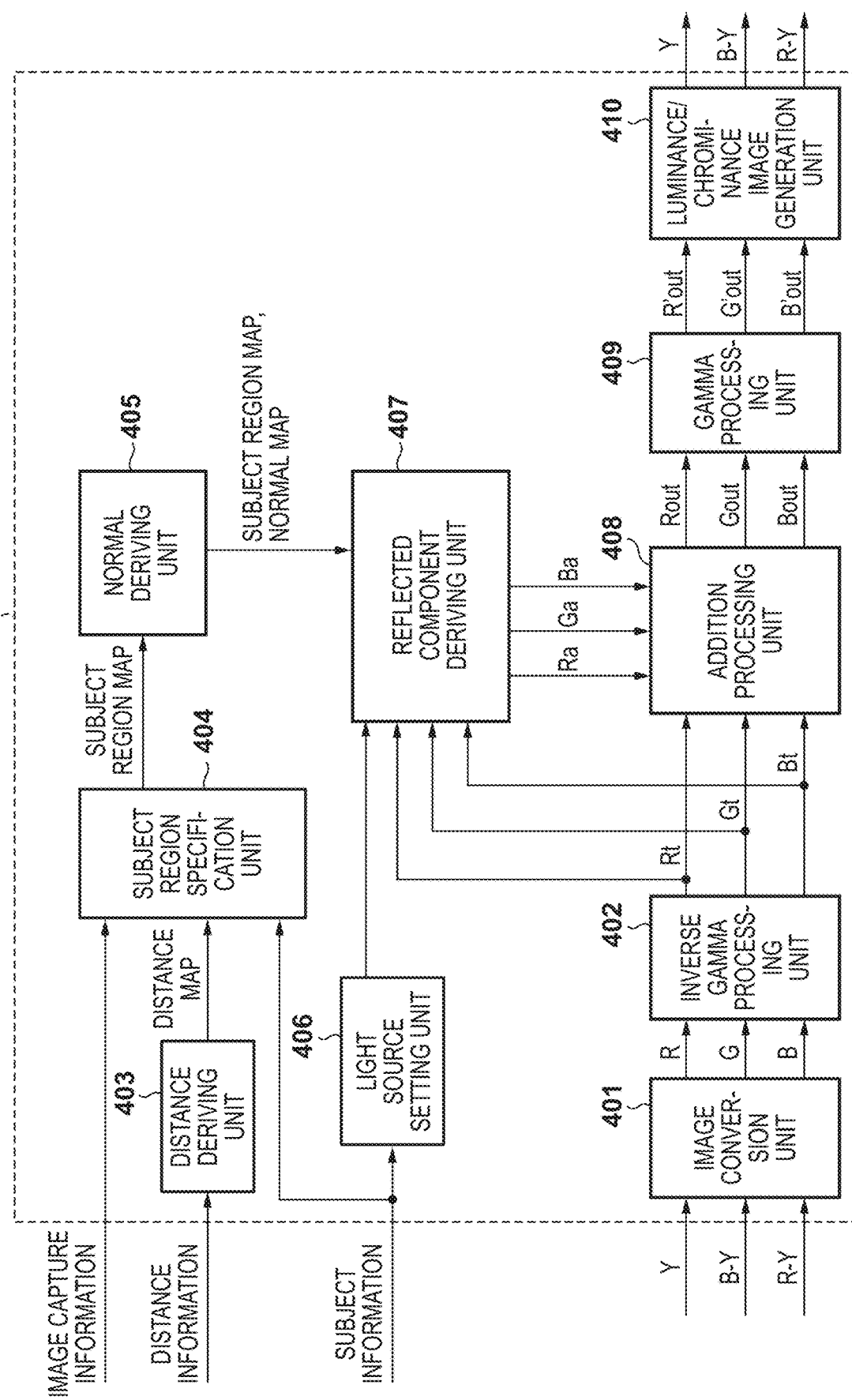
FIG. 4 is a block diagram exemplarily showing a detailed configuration of a relighting unit 114 according to the embodiment of the present invention.

Next, a description is given of a detailed configuration of the relighting unit 114 of the present embodiment with reference to FIG. 4. In the present embodiment, the relighting unit 114 performs relighting processing using the luminance image Y and the chrominance images B-Y and R-Y generated by the image processing unit 105, distance information configured by the ranging sensor 123, and subject information configured by the image processing unit 105.

An image conversion unit 401 converts the input luminance image Y and chrominance images B-Y and R-Y into an RGB image. The image conversion unit 401 outputs the RGB image generated through the conversion to an inverse gamma processing unit 402.

The inverse gamma processing unit 402 applies, to the RGB image, computation (inverse gamma processing) that has inverse properties of gamma correction that was applied by the luminance/gamma processing unit 204 and the color/gamma processing unit 206 of the image processing unit 105 with respect to the image group input to the relighting unit 114, thereby converting the RGB image into linear data. Then, the inverse gamma processing unit 402 outputs the RGB image (Rt, Gt, Bt) that has been converted into the linear data to a reflected component deriving unit 407 and an addition processing unit 408.

Meanwhile, a distance deriving unit 403 configures a sensor distance map based on the distance information obtained by the ranging sensor 123. The configured distance map is output to a subject region specification unit 404.

The subject region specification unit 404 configures a subject region map, which is referred to in the relighting processing, based on image capture information indicating image capture conditions (e.g., image capture settings) at the time of image capture, the sensor distance map, and the subject information configured by the subject information configuration unit 208. The subject region map mentioned here is a map that indicates the distances to subjects in a simplified form, and is two-dimensional information that indicates a target region to which the effects are added in the later-described relighting processing. More specifically, with respect to a region in which a subject exists within a captured image, it is regarded that the distances from the digital camera 100 are significant distances, and the subject region map stores values that have been derived using a predetermined scheme as pixel values of pixels in this region. Conversely, with respect to a region in which no subject exists (e.g., a background region), it may be regarded that the distances from the digital camera 100 are not significant, and the subject region map may store a fixed value indicating infinity as pixel values of pixels in this region. That is to say, the subject region map may store values derived based on the sensor distance map with respect to pixels corresponding to an image of a subject included within a predetermined distance range, and may store the fixed value with respect to pixels corresponding to an image of a subject that exists at other distances. The relighting unit 114 of the present embodiment is configured in such a manner that a method of determining a subject region and a method of generating the subject region map (especially pixel values of a region in which a subject exists) vary depending on the image capture conditions and the like. These details will be described later using a flowchart.

A normal deriving unit 405 generates a normal map as shape information indicating the shapes of subjects based on the subject region map configured by the subject region specification unit 404. The normal map may be generated using a known technique. Once the normal deriving unit 405 has configured the normal map, in which information of the normals N corresponding to respective pixels of the captured image is used as pixel values, it outputs the normal map to the reflected component deriving unit 407.

Although the present embodiment is described under the assumption that the distance deriving unit 403, subject region specification unit 404, and normal deriving unit 405 are configured as units that are built in the relighting unit 114, the present invention is not limited to being embodied in this way. These functional constituents, for example, may be configured as units that are built in the ranging sensor 123 or the image processing unit 105, or may exist as functional constituents that are independent from the relighting unit 114.

Based on the input subject information, a light source setting unit 406 sets various types of parameters of a virtual light source that irradiates subjects (people) in the captured image (RGB image). For example, in performing relighting processing that increases the brightness of a face as a whole with respect to a captured subject whose entire face is shown dark, the parameters of the virtual light source, such as the position, irradiation range, and intensity, are set so that the entire face region is included within the irradiation range.

Figure 5A:
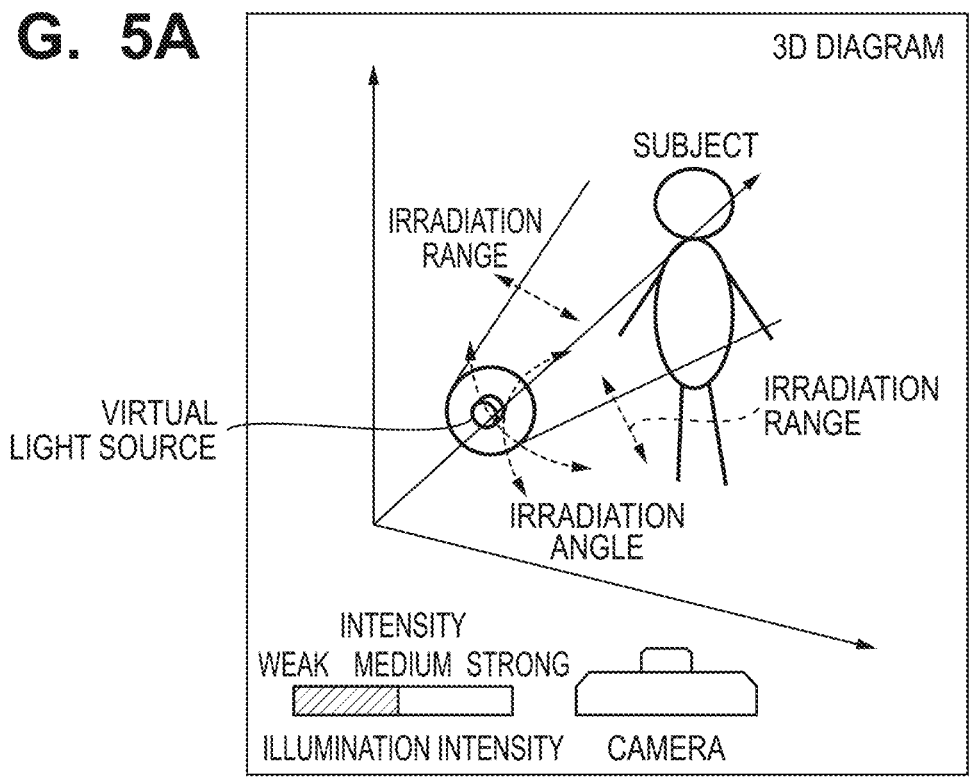
FIGS. 5A and 5B are diagrams for describing a virtual light source that is defined in relighting processing according to the embodiment of the present invention.
Figure 5B:
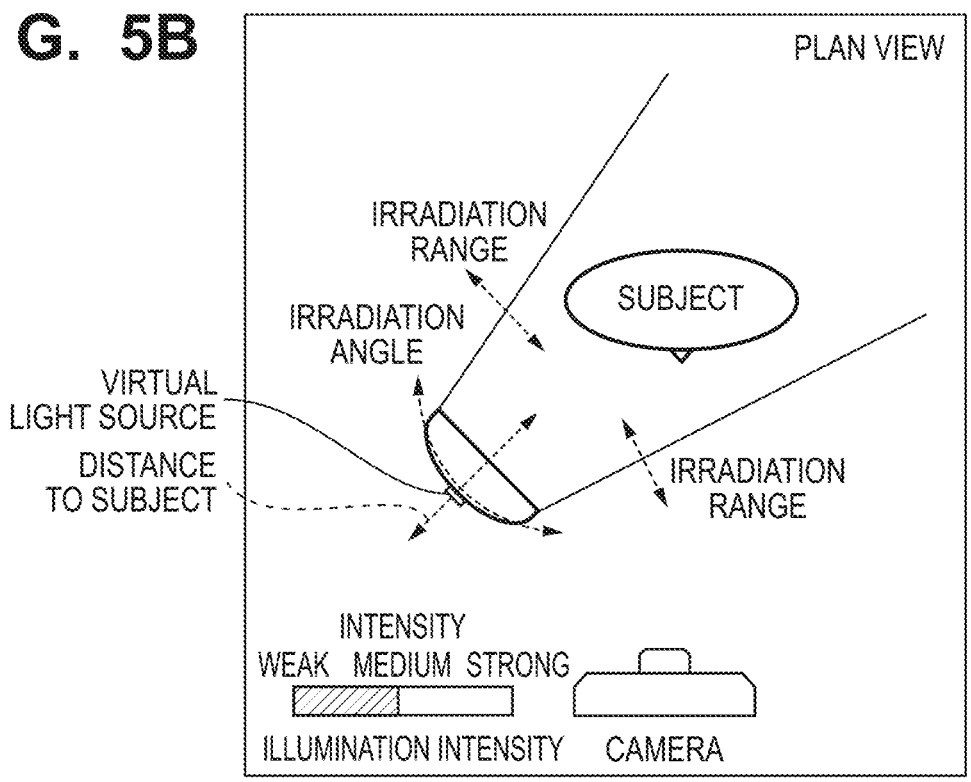

With reference to FIGS. 5A and 5B, a description is now given of the settings of various types of parameters of the virtual light source in a state when one person exists as a subject in the image capture range. FIG. 5A is a perspective view showing a positional relationship between the subject and the virtual light source, and FIG. 5B is a plan view showing a positional relationship between the subject and the virtual light source. In view of the attenuation property of light, a shorter distance between the virtual light source and the subject makes the subject illuminated more intensely, whereas a longer distance between the virtual light source and the subject makes the subject illuminated more weakly. Thus, the position of the virtual light source is determined in consideration of the extent at which the virtual light source is apart from the subject so as to achieve a desired illuminated state. Furthermore, the position of the virtual light source may be determined in accordance with, for example, the direction in which the surface of the subject to be illuminated is facing. Similarly, the magnitude of the illumination intensity (luminous intensity) of the virtual light source is also determined so as to place the subject in a desired illuminated state. An increase in the irradiation range of the virtual light source leads to an increase in the illuminated region of the subject, whereas a reduction in the irradiation range of the virtual light source leads to limitation on the illuminated region of the subject. Thus, the irradiation range of the virtual light source is determined in accordance with the size of the region to be illuminated.

In order to add the representation of reflection that is caused by light from the virtual light source during illumination by the virtual light source, the reflected component deriving unit 407 derives reflected components of light emitted by the virtual light source on the surface of a subject. The reflected component deriving unit 407 derives reflected components of light (virtual light) emitted from the virtual light source based on a distance K between the virtual light source and the subject that is determined based on the subject region map, normal information N based on the normal map, and various types of parameters of the virtual light source that have been set by the light source setting unit 406. Reflected components of the virtual light in each pixel of the RGB image are derived so that they are inversely proportional to the square of the distance K between the virtual light source and a subject corresponding to this pixel, and they are proportional to an inner product of vectors based on a normal N to the surface of the subject corresponding to this pixel and on the direction (light source direction) L from the virtual light source to the subject corresponding to this pixel.

Figure 6:
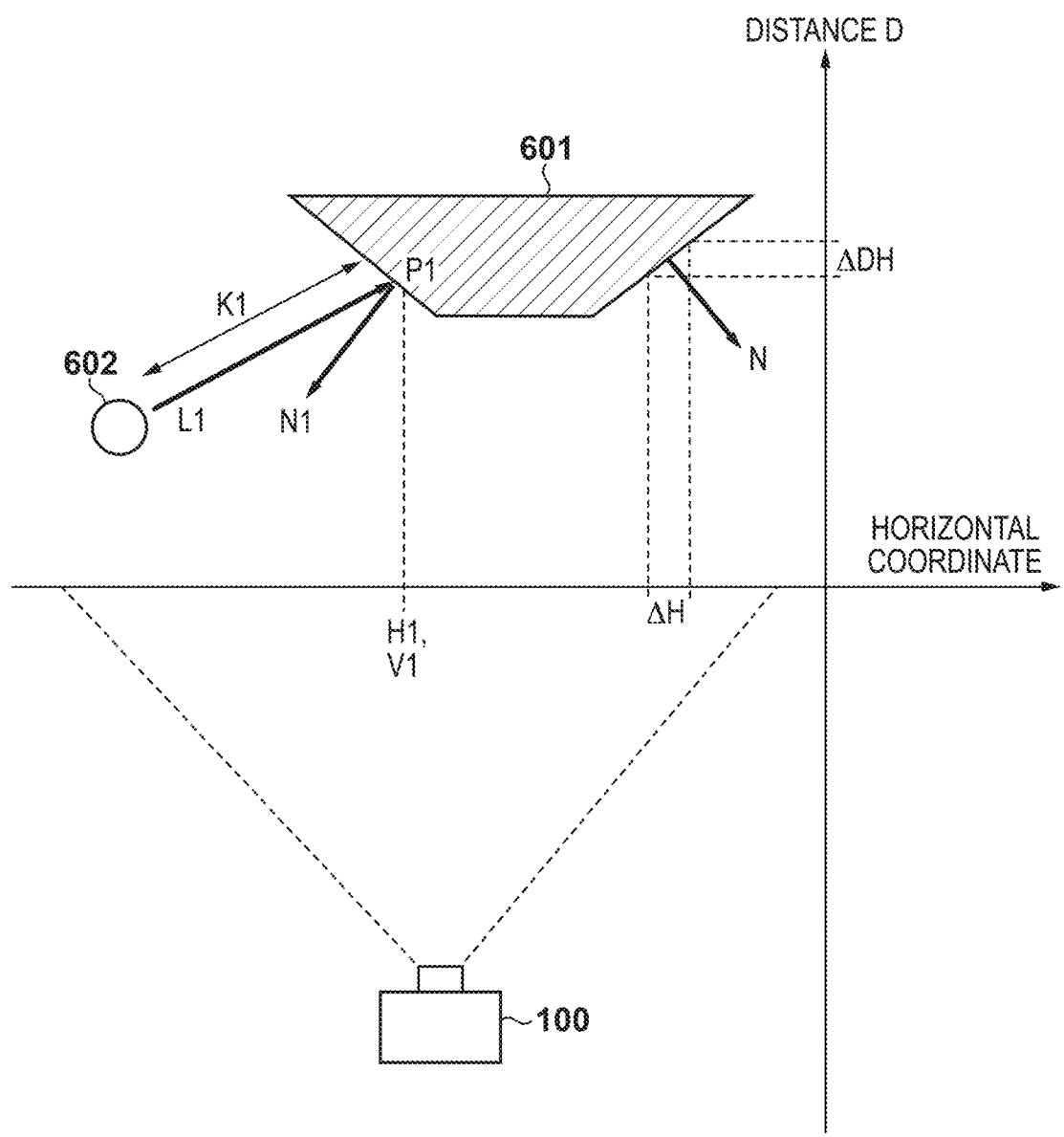
FIG. 6 is a diagram for describing a normal map used in the relighting processing according to the embodiment of the present invention.

A description is now given of a common method of deriving reflected components of virtual light, in connection with a case when a virtual light source 602 for relighting is placed as shown in FIG. 6. Although FIG. 6 shows only the horizontal direction of the RGB image in order to simplify the explanation, the same explanation applies with regard to the direction that is perpendicular to the two-dimensional plane shown (the vertical direction of the RGB image).

The following describes a method of deriving reflected components of virtual light with respect to a point P1 on a subject 601, which is indicated by a horizontal pixel position H1 and a non-illustrated vertical pixel position V1 in the RGB image. As stated earlier, reflected components of virtual light on the point P1 is proportional to an inner product of a normal vector N1 at the point P1 on the subject 601 and a light source direction vector L1 related to the virtual light source 602, and is inversely proportional to the square of the distance K1 between the virtual light source 602 and the point P1. Although shown as two-dimensional vectors in FIG. 6, the normal vector N1 and the light source direction vector L1 are three-dimensional vectors composed of the horizontal direction, the vertical direction, and the depth direction (the direction indicated by a distance D in FIG. 6) of the RGB image. In this case, reflected components (Ra, Ga, Ba) of virtual light at the point P1 on the subject 601 can be expressed as follows.

$$Ra = \alpha \times (-L1 \cdot N1)/K1^2 \times Rt$$

$$Ga = \alpha \times (-L1 \cdot N1)/K1^2 \times Gt$$

$$Ba = \alpha \times (-L1 \cdot N1)/K1^2 \times Bt \quad \text{(Expression 1)}$$

Here, α denotes the intensity of light of the virtual light source 602 and indicates a gain value of a relighting correction amount, and Rt, Gt, and Bt respectively indicate RGB components related to the point P1 in the RGB image input from the inverse gamma processing unit 402. The reflected components (Ra, Ga, Ba) of virtual light that have been derived by the reflected component deriving unit 407 in the foregoing manner are output to the addition processing unit 408. Although the present embodiment is described under the assumption that reflected components are derived so that they are inversely proportional to the square of the distance as indicated by Expression 1, it goes without saying that they may be derived using other computation methods.

The addition processing unit 408 performs processing for reflecting the influence of the input reflected components (Ra, Ga, Ba) of virtual light in the RGB image. That is to say, in order to reflect the influence of relighting, the addition processing unit 408 performs the following computation to add the influence to the RGB image from the inverse gamma processing unit 402.

$$Rout = Rt + Ra$$

$$Gout = Gt + Ga$$

$$Bout = Bt + Ba \quad \text{(Expression 2)}$$

Here, (Rout, Gout, Bout) respectively denote RGB components related to the point P1 in the RGB image after the influence of relighting has been reflected. After performing the processing for reflecting the influence of relighting, the addition processing unit 408 outputs the resultant RGB image to a gamma processing unit 409.

The gamma processing unit 409 applies gamma correction processing to the input post-relighting RGB image, and outputs the resultant RGB image to a luminance/chrominance image generation unit 410.

The luminance/chrominance image generation unit 410 generates a luminance image Y and chrominance images R-Y and B-Y by converting the input RGB image (Rout, G'out, B'out) that has undergone gamma processing, and outputs the generated images.

By applying the relighting processing to a captured image in the relighting unit 114 in the foregoing manner, an image in which the illuminated state of a subject has been changed can be obtained after image capture. For example, when a subject appears dark in a captured image due to, for example, indoor image capture as shown in FIG. 7A, application of the relighting processing can generate an image in which the illuminated state of the region of the subject has been corrected as shown in FIG. 7B. It is sufficient that images obtained by applying the relighting processing be accumulated by the system control unit 50 into the image memory 106 via the memory control unit 107, and thereafter undergo compression encoding in the compression/decompression unit 110 and be stored into the recording medium 112.

<<Relighting Processing>>

Figure 8:
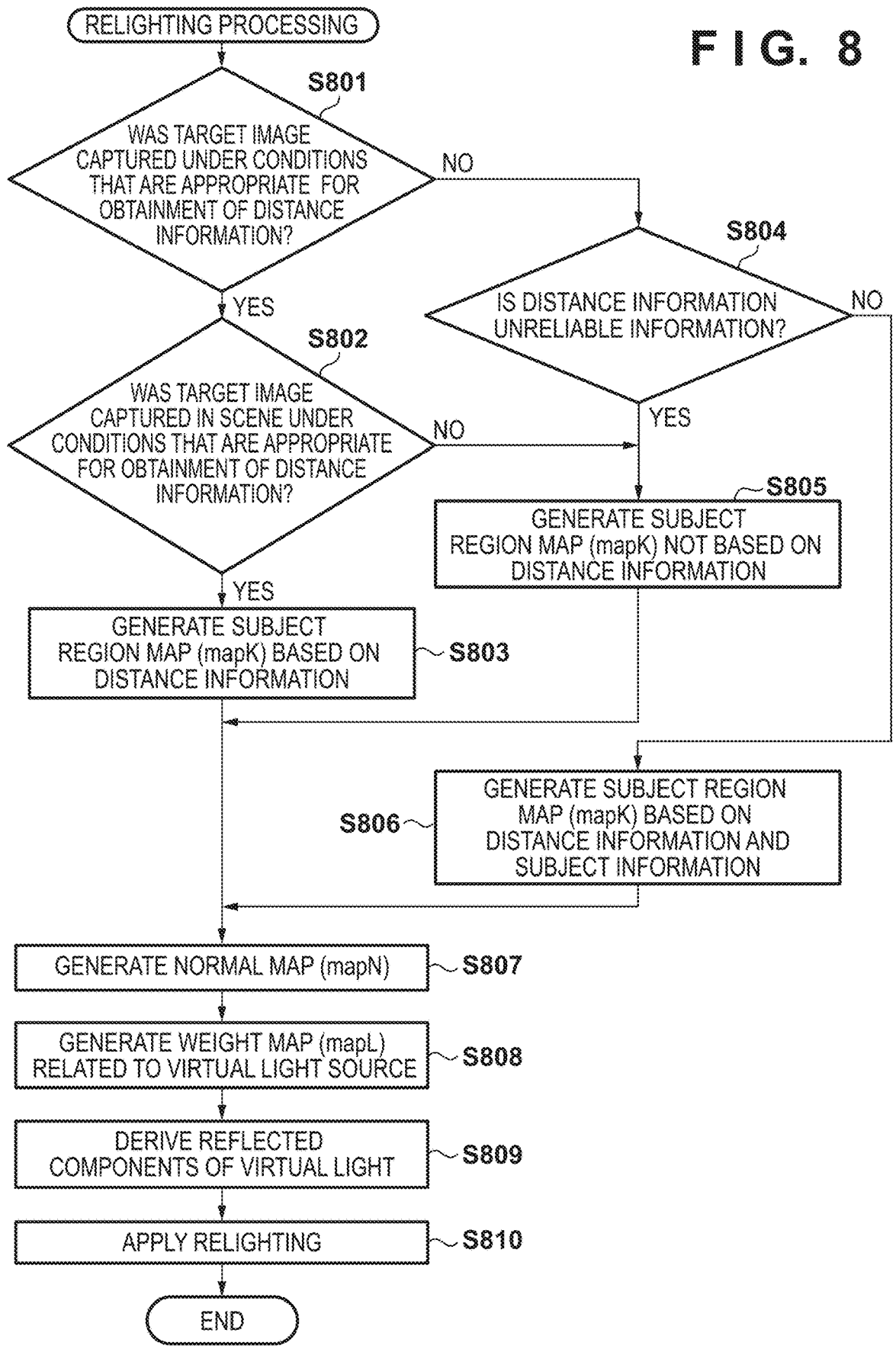
FIG. 8 is a flowchart exemplarily showing the relighting processing executed by the relighting unit 114 according to the embodiment of the present invention.

Using a flowchart of FIG. 8, the following describes specific processing in relation to the relighting processing of the present embodiment, which is performed using the relighting unit 114 configured in the above-described manner. Processing corresponding to this flowchart can be realized by, for example, the system control unit 50 reading out a corresponding processing program stored in the nonvolatile memory 121, deploying the processing program to the system memory 122, executing the processing program, and controlling the operations of the relighting unit 114. The present relighting processing will be described under the assumption that it is started when, for example, an instruction for changing the illuminated state of a subject has been issued with respect to a captured image stored in the recording medium 112. Here, it is assumed that the captured image is composed of a luminance image Y and chrominance images R-Y and B-Y as stated earlier, and has been deployed to the image memory 106 at the time of execution of the processing. Furthermore, regarding the captured image, it is assumed that distance information, subject information, and information of the image capture settings at the time of image capture related to the captured image are recorded in association with one another, and are configured in such a manner that each of them can be referred to in the present relighting processing.

In step S801, the subject region specification unit 404 refers to information of the image capture settings related to a target captured image (target image), and determines whether the target image was captured under conditions that are appropriate for the obtainment of distance information. In the digital camera 100 of the present embodiment, the ranging sensor 123 measures a subject distance based on a stereoscopic method that uses a group of two images. Thus, it is assumed that conditions that are appropriate for the obtainment of distance information have been designated in relation to the value of the sensitivity setting (ISO value) that was set at the time of image capture. According to the stereoscopic method, as a subject distance is derived based on an image, the accuracy of measurement decreases in accordance with the amount of noise included in this image. Therefore, the subject region specification unit 404 makes the determination in the present step based on whether the ISO value that was set at the time of image capture falls below a first threshold $ISO_{th1}$, which is designated as an upper limit of ISO values with which a small amount of noise appears in the captured image. When the subject region specification unit 404 determines that the target image was captured under conditions that are appropriate for the obtainment of distance information (ISO value<$ISO_{th1}$), processing proceeds to step S802. When it determines that the target image was not captured under such conditions, processing proceeds to step S804.

In step S802, the subject region specification unit 404 refers to the state of the target image and subject information related to the target image, and determines whether the scene in which image capture was performed was under conditions that are appropriate for the obtainment of distance information. The determination of the present step is made independently of distance information, unlike step S801.

While the accuracy of measurement of a subject distance derived based on the stereoscopic method changes in accordance with the amount of noise included in two images used in the measurement, this accuracy is also influenced by the accuracy of detection of images (patterns) related to the same subject in the two images. As the accuracy of detection of patterns related to the same subject depends on the distribution of characteristic patterns included within the images, this accuracy decreases when the captured image has a low contrast ratio. Therefore, the larger a low-contrast region in the target image, the more inappropriate the image capture scene is for the obtainment of distance information. Furthermore, a region that is mainly occupied by pixels of similar colors (skin tones), such as a surface of a human face, can also be a region with a low contrast ratio depending on the size of an image that appears in the captured image. That is to say, when a face region has been captured in such a manner that its size takes up a large part of the captured image, characteristic patterns are hard to extract due to a large number of pixels of similar colors, and thus the accuracy of detection of patterns related to the same subject can decrease. Conversely, when a face region has been captured in a small size in the captured image, characteristic patterns are concentrated, and there is a possibility that the characteristic patterns are hard to distinguish. This, too, can reduce the accuracy of detection of patterns related to the same subject.

Therefore, the subject region specification unit 404 makes the determination in the present step based on whether the percentage of a low-contrast region within the target image falls below a threshold and the size of a detected face region falls within a predetermined area range (not too small and not too large). The threshold related to the percentage of the low-contrast region and information of the area range of the size of the detected face region may be derived experimentally by, for example, measuring subject distances in a wide variety of scenes. When the subject region specification unit 404 determines that the scene in which the target image was captured was under conditions that are appropriate for the obtainment of distance information, processing proceeds to step S803. When it determines that the scene was under inappropriate conditions, processing proceeds to step S805.

In step S803, the subject region specification unit 404 generates a subject region map (mapK) based solely on distance information. Specifically, first, the distance deriving unit 403 generates a sensor distance map, which is two-dimensional information in which respective pixels indicate subject distances K (distances between subjects of these pixels and, for example, a principal point of a lens or an image capturing plane of the image sensor), based on information of the image capture settings and the distance information. Then, the subject region specification unit 404 generates the subject region map (mapK: first subject region) by weighting, with use of the subject distances, values obtained by normalizing the reciprocals of the squares of pixel values K of respective pixels in this distance map based on a bit width. That is to say, as the subject region map generated in the present step is associated with the distance information that has been derived based on a captured image with a highly reliability degree, values based on the distance information are stored as pixels values in a region in which a subject exists in this map. Although the present embodiment is described under the assumption that the subject region map is generated based solely on the distance information upon reaching the present step, the subject region map may be generated using the distance information preferentially.

On the other hand, when it is determined that the target image was not captured under conditions that are appropriate for the obtainment of distance information in step S801, the subject region specification unit 404 determines whether the distance information to be referred to is unreliable information based on information of the image capture settings related to the target image in step S804. The determination of the present step is made based on the ISO value at the time of image capture of the target image, similarly to step S801. More specifically, the subject region specification unit 404 makes the determination in the present step based on whether the ISO value that was set at the time of image capture of the target image exceeds a second threshold $ISO_{th2}$ ($ISO_{th1}$<$ISO_{th2}$), which is an upper limit used in determining that the distance information is reliable. When the subject region specification unit 404 determines that the distance information is unreliable information (ISO value>$ISO_{th2}$), processing proceeds to step S805. When it determines that the distance information is information having a reliability degree with which reference can be made in the processing, processing proceeds to step S806.

In step S805, as the distance information is unreliable information, the subject region specification unit 404 generates the subject region map (map K: second subject region) based solely on the subject information without using the distance information. That is to say, the subject region specification unit 404 determines regions in which subjects (people) exist and regions in which no subject exists based on information that is included in the subject information and that indicates the number of people who serve as subjects, their facial sizes, their positions, and the like, within the target image.

Figure 9:
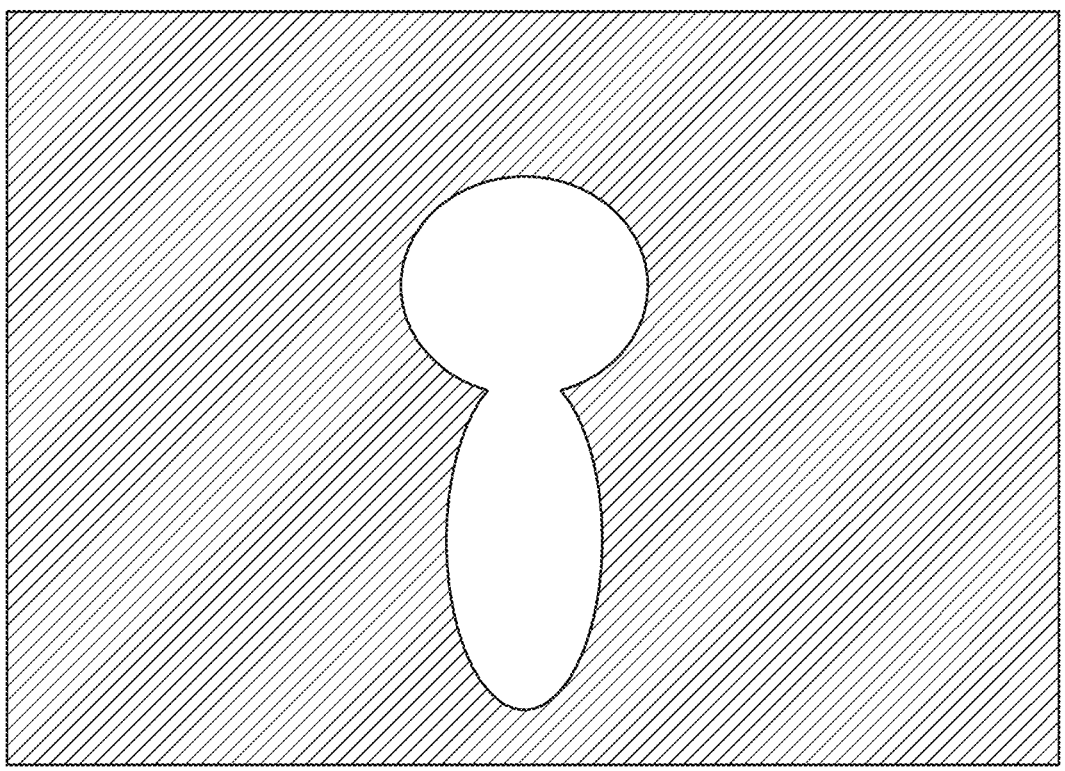
FIG. 9 is a diagram exemplarily showing a model indicating a human shape used in the relighting processing according to the embodiment of the present invention.

At this time, a region in which a subject exists may be configured as a region having a predetermined shape that has been designated based on, for example, the position of an image of a detected face or organ that composes a face. On the presumption that there is a high possibility of a torso being situated below a face in portrait image capture, the present embodiment adopts a method that estimates a region in which a subject exists using, for example, a model shown in FIG. 9. FIG. 9 is a model showing a human shape, which is composed of a face portion and a torso portion. The subject region specification unit 404 deforms the model so that the face portion of the model of FIG. 9 matches the position of an image of a detected face or organ that composes a face. Then, a region represented by this deformed model is determined as a region in which a subject exists.

Then, the subject region specification unit 404 regards a region in which no subject exists as a background and stores values corresponding to infinity distances therefor, and regards a region in which a subject exists as a short-distance view and allocates a pre-designated distance thereto. In this way, the subject region map is generated similarly to step S803. That is to say, it is assumed that the subject region specification unit 404 allocates the same distance to an entirety of a region represented by the model in forming the subject region map. In other words, in the subject region map, all distances are equal within a subject region. As a result, in the subject region map generated in the present step, each pixel stores a value that indicates weighting based on subject detection. Furthermore, at this time, distance-based weighting (e.g., a weight of 1 for the face portion, and a weight of 0.9 for the torso portion) may be set with respect to the model so that different weights are used for different portions within a subject region.

Although the present embodiment is described under the assumption that the subject region map is generated based solely on the subject information upon reaching the present step, the subject region map may be generated using the subject information preferentially.

On the other hand, when it is determined that the distance information is information having a reliability degree with which reference can be made in step S804, the subject region specification unit 404 generates a subject region map (mapK) based on the distance information and the subject information in step S806. It is assumed that the subject region map generated in the present step is obtained by compositing together, by way of weighted addition, the subject region map that is generated based solely on the distance information in step S803 and the subject region map that is generated based solely on the subject information in step S805. For example, the subject region specification unit 404 may perform weighted addition of these subject region maps in accordance with the ISO value at the time of image capture of the target image. For example, the subject region map may be configured in such a manner that, in combining the maps, a larger weight is used for pixel values derived based on the distance information (distance map) than for pixel values derived based on the subject information as the ISO value at the time of image capture is closer to $ISO_{th1}$. Conversely, for example, the subject region map may be configured in such a manner that, in combining the maps, a larger weight is used for pixel values derived based on the subject information than for pixel values derived based on the distance information as the ISO value at the time of image capture is closer to $ISO_{th2}$. As described above, upon reaching the present step, the digital camera 100 of the present embodiment performs control so that, in deriving pixel values of the subject region maps, the composition rates (weighted addition rates) thereof vary depending on a reliability degree.

In step S807, using a known technique, the normal deriving unit 405 generates a normal map (mapN) (shape information) that indicates the shapes of subjects based on the subject region map generated by the subject region specification unit 404.

In step S808, with respect to a virtual light source that is to be applied in the relighting processing, the light source setting unit 406 generates a weight map related to the virtual light source that stores values pertaining to the directions from respective pixel positions to the virtual light source (light source directions). Specifically, with respect to the virtual light source to be defined, the light source setting unit 406 first derives a light source direction vector L on a per-pixel basis, and obtains the direction cosines thereof relative to respective coordinate axis directions. Then, the light source setting unit 406 stores an arbitrary bit width representing the obtained direction cosines as a pixel value on a per-pixel basis, thereby configuring the weight map (mapL) related to the virtual light source.

Among parameters of the virtual light source that are used in deriving the light source vectors L of the virtual light source, the position and intensity may be determined by the light source setting unit 406 based on the subject information configured by the subject information configuration unit 208. For example, in a state where the luminance distribution within a face region of a subject is uneven, the light source setting unit 406 determines the position and intensity of the virtual light source so that a region with low luminance values is irradiated with the virtual light. In this case, provided that a pixel within a region with low luminance values in the captured image has coordinates (x1, y1), reflected components ($Ra_{(x1,y1)}$, $Ga_{(x1,y1)}$, $Ba_{(x1,y1)}$) of virtual light on a subject located at this position are as follows.

$$Ra_{(x1,y1)} = \alpha \times (-L_{(x1,y1)} \cdot N_{(x1,y1)})/K_{(x1,y1)}^2 \times Rt$$

$$Ga_{(x1,y1)} = \alpha \times (-L_{(x1,y1)} \cdot N_{(x1,y1)})/K_{(x1,y1)}^2 \times Gt$$

$$Ba_{(x1,y1)} = \alpha \times (-L_{(x1,y1)} \cdot N_{(x1,y1)})/K_{(x1,y1)}^2 \times Bt \quad \text{(Expression 3)}$$

Here, $\alpha$ is the intensity of light of the virtual light source, and $L_{(x1,y1)}$ is a light source direction vector of the virtual light source from the subject at the pixel with coordinates (x1, y1). Also, $N_{(x1,y1)}$ is a normal vector at the same coordinates in the corresponding normal map, and K (x1, y1) indicates a distance between the virtual light source and a position on the subject corresponding to the same coordinates (x1, y1) in the subject region map. In order to irradiate the subject at coordinates (x1, y1) in the region with low luminance values with virtual light, the intensity a of the virtual light source and the distance $K_{(x1,y1)}$ to the subject are controlled so that $(Ra_{(x1,y1)}, Ga_{(x1,y1)}, Ba_{(x1,y1)})$ have positive values. Furthermore, among the parameters of the virtual light source, the irradiation range is determined by the light source setting unit 406 based on the luminance distribution within a detected face region.

Note that if the intensity a of the virtual light source is too high, there is a possibility that unfavorable luminance representations, such as blown-out highlights and inverted tones, appear. Therefore, the light source setting unit 406 controls and determines a value range for the intensity a of the virtual light source using a predetermined threshold β so that the value range includes: (the average luminance value of a region with high luminance values that is in a region outside the irradiation range of the virtual light)±β.

As described above, the light source setting unit 406 may derive the position range, the intensity range, and the irradiation range of the virtual light source, and determine, for example, average values of these ranges as the position, the intensity, and the irradiation range of the virtual light source. Although the present embodiment is described under the assumption that one virtual light source is defined for ease of understanding, it goes without saying that a plurality of virtual light sources may be defined in performing the relighting processing. Furthermore, although the present embodiment is described under the assumption that relighting processing that corrects a subject to be brighter using additive light is performed, it may be processing that corrects a subject to be darker. In this case, it is sufficient to determine a gain value a of the virtual light source to be negative (subtractive light).

In step S809, the reflected component deriving unit 407 derives reflected components (Ra, Ga, Ba) of the virtual light. The reflected components (Ra, Ga, Ba) can be derived by Expression 1 using the parameters determined in step S808. At this time, the reflected component deriving unit 407 derives the reflected components (Ra, Ga, Ba) by executing the computation of Expression 1 on a per-pixel basis using the obtained subject region map (mapK), normal map (mapN), and weight map (mapL) related to the virtual light source. Although the present embodiment is described under the assumption that color components of diffuse reflection related to lightness adjustment are simply derived, color components of specular reflection may be further derived in a mode that takes into consideration the type of the virtual light source and materials of subjects.

In step S810, the addition processing unit 408 performs the relighting processing. Specifically, the addition processing unit 408 generates a post-relighting image by adding the reflected components (Ra, Ga, Ba) of the virtual light derived in step S809 to the output (Rt, Gt, Bt) from the inverse gamma processing unit 402.

In the above-described manner, after image capture, the image processing apparatus of the present embodiment can generate an image to which favorable relighting processing has been applied in accordance with an image capture environment and image capture conditions, based on the distance information and the subject information that have been obtained in correspondence with a captured image. More specifically, with conventional schemes, a desired relighting result may not be achieved as a subject region cannot be favorably specified. On the other hand, with the scheme of the present embodiment, a desired result can be achieved because processing is performed with reference to one or both of the distance information and the subject information depending on the situation. Therefore, the image processing apparatus can favorably specify a subject region in accordance with image capture conditions, and desired effects can be added to the subject region.

Although the present embodiment has been described in relation to a method of specifying a subject region in a case when relighting processing is applied, the present invention is not limited to being embodied in this way. That is to say, the present invention is applicable as long as a subject region within a captured image is favorably specified and arbitrary addition processing is performed after image capture. In other words, in the present invention, it is sufficient to use different methods of specifying a subject region depending on the conditions under which the distance information is obtained in the image processing apparatus that is configured to be capable of using both of a method that specifies a subject region based on the distance information and a method that specifies a subject region independently of the distance information.

Furthermore, it is assumed in the foregoing description that, in order to perform the relighting processing on the image processing apparatus of the present embodiment, the subject region map stores information of subject distances with respect to pixels in a subject region, no matter which method was used to generate the subject region map, so that the normal map for estimating the shapes of subjects can be generated. However, the present invention is not limited to being embodied in this way. When addition processing that need not take the shapes of subjects into consideration is performed, the subject region map need not hold information of subject distances as long as it stores information that allows a subject region to be specified.

Furthermore, it is assumed in the foregoing description that, in the image processing apparatus of the present embodiment, the ranging sensor 123 configures the distance information by performing ranging based on the stereoscopic method that uses two captured images, and the method of generating the subject region map is controlled in accordance with the ISO value that was set at the time of image capture. That is to say, the foregoing description has been provided under the assumption that the accuracy of derivation of the distance information is decided on based on the ISO value, and based on the result of the decision, one or both of the distance information and the subject information are determined to be used as information that is referred to in generating the subject region map. However, the present invention is not limited to being embodied in this way. For example, in a mode that acquires a plurality of subject images based on light beams that have passed through different pupil regions of the image capturing optical system and obtains the distance information based on the phase difference therebetween, the aforementioned control may be performed in accordance with an f-number at the time of image capture. More specifically, in this configuration, a smaller f-number leads to easier obtainment of the distance information. Thus, under this condition, it is sufficient to perform control so that the rate of weighting based on the distance information is increased in generating the subject region map. Conversely, it is sufficient to perform control so that the larger the f-number, the higher the rate of weighting based on the subject information in generating the subject region map. In this mode also, it is sufficient for the configuration to prepare thresholds corresponding to two levels with respect to the f-number, similarly to the case of the ISO value, and generate the subject region map based solely on the distance information when the f-number falls below the threshold corresponding to the first level. On the other hand, it is sufficient for the configuration to generate the subject region map based solely on the subject information when the f-number exceeds the threshold corresponding to the second level, which is larger than the threshold corresponding to the first level.

Furthermore, although the present embodiment has been described in relation to an example in which the digital camera 100, which is an image capturing apparatus having an image capturing function, is provided with a function to perform the relighting processing, it should be readily understood that the present invention is not limited to being embodied in this way. The present invention can be embodied on an apparatus that is configured to be capable of obtaining a captured image along with distance information and subject information pertaining to the time of image capture, and can also be embodied using an image capturing system that includes an image capturing apparatus and an image processing apparatus.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out to and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus that executes, with respect to a captured image, image processing for a region that includes a predetermined subject, the image processing apparatus comprising:

an obtaining unit configured to obtain distance information and subject information with respect to the captured image, the distance information indicating a distribution of subject distances in a depth direction, the subject information indicating a result of detection of the predetermined subject included in the captured image, the distribution of the subject distances in the distance information having been derived based on the captured image;

a first specifying unit configured, based on the distance information obtained by the obtaining unit, to specify a first subject region in which images of subjects that exist in a predetermined distance range are distributed in the captured image;

a second specifying unit configured, based on the subject information and independently of the distance information obtained by the obtaining unit, to specify a second subject region that includes a region from which the predetermined subject has been detected in the captured image; and a determining unit configured to determine a target region for which the image processing is executed with reference to at least one of the first subject region and the second subject region, wherein the determining unit makes a subject region that is referred to vary depending on at least one of an image capture condition of the captured image and a state of the captured image, the determining unit decides on the image capture condition of the captured image based on an image capture setting at the time of image capture of the captured image, the determining unit makes a subject region that is referred to vary depending on the decision, and, when a sensitivity setting at the time of image capture of the captured image exceeds a first threshold, the determining unit determines the target region with reference to the second subject region in preference to the first subject region, the sensitivity setting being an ISO value.

2. The image processing apparatus according to claim 1, wherein, when the ISO value at the time of image capture of the captured image exceeds a second threshold less than the first threshold and falls below the first threshold, the determining unit determines the target region through weighted composition of the first subject region and the second subject region.

3. The image processing apparatus according to claim 2, wherein the determining unit makes weighting rates of the first subject region and the second subject region in the weighted composition vary depending on the ISO value at the time of image capture of the captured image.

4. The image processing apparatus according to claim 3, wherein the determining unit performs control so that the closer the ISO value at the time of image capture of the captured image to the second threshold, the higher the weighting rate of the first subject region compared to the weighting rate of the second subject region.

5. The image processing apparatus according to claim 1, wherein the subject information includes information indicating a region related to the predetermined subject within the captured image, and the determining unit decides on the state of the captured image based on a contrast ratio of the captured image or a size of the region related to the predetermined subject in the captured image, and makes a subject region that is referred to vary based on the decision.

6. The image processing apparatus according to claim 5, wherein, when the contrast ratio of the captured image falls below a predetermined threshold, the determining unit determines the target region with reference to the second subject region in preference to the first subject region.

7. The image processing apparatus according to claim 5, wherein, when a size of the region from which the predetermined subject has been detected in the captured image does not fit within a predetermined size range, the determining unit determines the target region with reference to the second subject region in preference to the first subject region.

8. The image processing apparatus according to claim 1, wherein the image processing includes processing for adding an influence of a case when a virtual light source has been placed to a subject included in the target region determined by the determining unit within the captured image, and
the image processing apparatus further comprises an executing unit configured to execute the adding processing.

9. An image capturing apparatus comprising:
an image capturing unit configured to capture a captured image; and
the image processing apparatus according to claim 1.

10. A computer-readable storage medium storing a program for causing a computer to function as each unit of the image processing apparatus according to claim 1.

11. An image processing apparatus that executes, with respect to a captured image, image processing for a region that includes a predetermined subject, the image processing apparatus comprising:
an obtaining unit configured to obtain distance information and subject information with respect to the captured image, the distance information indicating a distribution of subject distances in a depth direction, the subject information indicating a result of detection of the predetermined subject included in the captured image, the distribution of the subject distances in the distance information having been derived based on the captured image;
a first specifying unit configured, based on the distance information obtained by the obtaining unit, to specify a first subject region in which images of subjects that exist in a predetermined distance range are distributed in the captured image;
a second specifying unit configured, based on the subject information and independently of the distance information obtained by the obtaining unit, to specify a second subject region that includes a region from which the predetermined subject has been detected in the captured image; and
a determining unit configured to determine a target region for which the image processing is executed with reference to at least one of the first subject region and the second subject region, wherein the determining unit makes a subject region that is referred to vary depending on at least one of an image capture condition of the captured image and a state of the captured image, the determining unit decides on the image capture condition of the captured image based on an image capture setting at the time of image capture of the captured image, the determining unit makes a subject region that is referred to vary depending on the decision, and, when an f-number at the time of image capture of the captured image exceeds a third threshold, the determining unit determines the target region with reference to the second subject region in preference to the first subject region.

12. The image processing apparatus according to claim 11, wherein, when the f-number at the time of image capture of the captured image exceeds a fourth threshold less than the third threshold and falls below the third threshold, the determining unit determines the target region through weighted composition of the first subject region and the second subject region.

13. The image processing apparatus according to claim 12, wherein the determining unit makes weighting rates of the first subject region and the second subject region in the weighted composition vary depending on the f-number at the time of image capture of the captured image.

14. The image processing apparatus according to claim 13, wherein the determining unit performs control so that the closer the f-number at the time of image capture of the captured image to the fourth threshold, the higher the weighting rate of the first subject region compared to the weighting rate of the second subject region.

15. The image processing apparatus according to claim 11, wherein the image processing includes processing for adding an influence of a case when a virtual light source has been placed to a subject included in the target region determined by the determining unit within the captured image, and
the image processing apparatus further comprises an executing unit configured to execute the adding processing.

16. An image capturing apparatus comprising:
an image capturing unit configured to capture a captured image; and
the image processing apparatus according to claim 11.

17. A computer-readable storage medium storing a program for causing a computer to function as each unit of the image processing apparatus according to claim 11.

18. The image processing apparatus according to claim 11, wherein the subject information includes information indicating a region related to the predetermined subject within the captured image, and
the determining unit decides on the state of the captured image based on a contrast ratio of the captured image or on a size of the region related to the predetermined subject in the captured image, and makes a subject region that is referred to vary based on the decision.

19. The image processing apparatus according to claim 18, wherein, when the contrast ratio of the captured image falls below a predetermined threshold, the determining unit determines the target region with reference to the second subject region in preference to the first subject region.

20. The image processing apparatus according to claim 18, wherein, when a size of the region from which the predetermined subject has been detected in the captured image does not fit within a predetermined size range, the determining unit determines the target region with reference to the second subject region in preference to the first subject region.

21. A control method for an image processing apparatus that executes, with respect to a captured image, image processing for a region that includes a predetermined subject, the control method comprising:
obtaining distance information and subject information with respect to the captured image, the distance information indicating a distribution of subject distances in a depth direction, the subject information indicating a result of detection of the predetermined subject included in the captured image, the distribution of the subject distances in the distance information having been derived based on the captured image;

based on the distance information obtained in the obtaining, specifying a first subject region in which images of subjects that exist in a predetermined distance range are distributed in the captured image;

based on the subject information and independently of the distance information obtained in the obtaining, specifying a second subject region that includes a region from which the predetermined subject has been detected in the captured image; and determining a target region for which the image processing is executed with reference to at least one of the first subject region and the second subject region, wherein, in the determining, a subject region that is referred to varies depending on at least one of an image capture condition of the captured image and a state of the captured image, in the determining, the image capture condition of the captured image is decided based on an image capture setting at the time of image capture of the captured image, and a subject region that is referred to varies depending on the decision, and, when a sensitivity setting at the time of image capture of the captured image exceeds a first threshold, in the determining, the target region is determined with reference to the second subject region in preference to the first subject region, the sensitivity setting being an ISO value.

22. A control method for an image processing apparatus that executes, with respect to a captured image, image processing for a region that includes a predetermined subject, the control method comprising:

obtaining distance information and subject information with respect to the captured image, the distance information indicating a distribution of subject distances in a depth direction, the subject information indicating a result of detection of the predetermined subject included in the captured image, the distribution of the subject distances in the distance information having been derived based on the captured image;

based on the distance information obtained in the obtaining, specifying a first subject region in which images of subjects that exist in a predetermined distance range are distributed in the captured image;

based on the subject information and independently of the distance information obtained in the obtaining, specifying a second subject region that includes a region from which the predetermined subject has been detected in the captured image; and determining a target region for which the image processing is executed with reference to at least one of the first subject region and the second subject region, wherein, in the determining, a subject region that is referred to varies depending on at least one of an image capture condition of the captured image and a state of the captured image, in the determining, the image capture condition of the captured image is decided based on an image capture setting at the time of image capture of the captured image, and a subject region that is referred to varies depending on the decision, and, when an f-number at the time of image capture of the captured image exceeds a third threshold, in the determining, the target region is determined with reference to the second subject region in preference to the first subject region.

* * * * *